Jan. 7, 1930.  F. R. SCHUBERT  1,742,418

CAGE FOR ANTIFRICTION BEARINGS

Filed Aug. 30, 1926

Inventor

FRANK R. SCHUBERT

By John G. ——
Attorney

Patented Jan. 7, 1930

1,742,418

UNITED STATES PATENT OFFICE

FRANK R. SCHUBERT, OF VALPARAISO, INDIANA, ASSIGNOR TO McGILL METAL COMPANY, OF VALPARAISO, INDIANA, A CORPORATION OF INDIANA

CAGE FOR ANTIFRICTION BEARINGS

Application filed August 30, 1926. Serial No. 132,512.

The invention relates to ball spacing cages for bearings of the annular type, which are interposed between the inner and outer raceways for the purpose of keeping the balls in proper spaced relation, and particularly to a cage that will permit of a thorough and complete cleansing of the bearing at any time cleaning is necessary.

In a cage such as disclosed in my co-pending application Serial Number 98,738 filed March 31, 1926, cleaning of the bearing is difficult because the cage so closely surrounds the balls and also runs so closely to the raceways, that space for the removal of any grit or foreign matter is very small.

The method usually employed in cleaning bearings of this type consists in holding the outer raceway stationary and rotating the inner raceway at high speed in a liquid bath. The centrifugal force thus developed by the inner raceway and the balls serves to expel practically all foreign matter, but sometimes small particles of grit will not pass the balls which run quite closely to the pocket walls, nor will they pass the small space between the base ring or flange of the cage and the outer diameter of the inner raceway in a direction normal to the centrifugal force developed. It therefore becomes necessary to provide special exits for such foreign matter.

My invention, described herein, contemplates providing exit openings that do not weaken the cage structure in any way, and located where the centrifugal force of the inner raceway as well as the centrifugal force developed by the balls will create a current of oil circumferentially around the ball cage and outwardly through said exit openings, which will operate in an obvious manner, to wash out and expel metal chips and other dirt particles—thus effectively cleaning the bearing.

With the above and other objects in view, my invention consists of the arrangement, combination and construction of the various elements of my improved device as described in the specifications, claimed in my claim and shown in the accompanying drawings, in which:

Fig. 1 is a section of an annular ball bearing showing my cage in section both at a ball and between a pair of balls.

Figure 1:
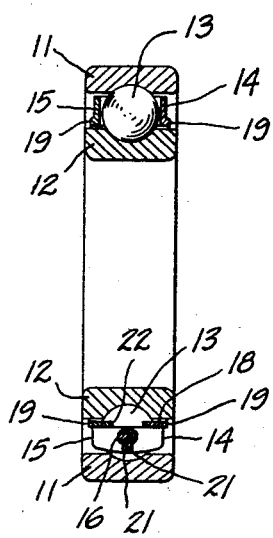
Figure 2:
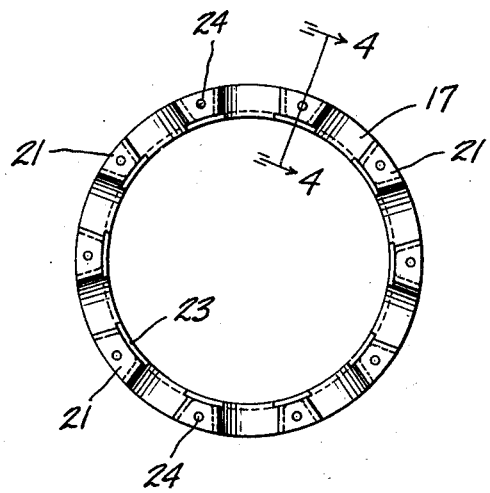
Fig. 2 is a side view of one-half portion of my cage.

In the drawings 11 designates the outer raceway 12 the inner raceway and 13 the balls of an annular ball bearing. 14 and 15 are the major portions of the ball spacing cage, 16 are rivets holding the two portions 14 and 15 together in assembled relation. In each of the portions 14 and 15 appear half ball pockets 17, which when assembled as in Fig. 3 appear as whole ball pockets 20. For this description it can be assumed that the parts 14 and 15 are identical and that the division line between them is on the plane determined by the centers of the balls.

In the particular embodiment shown in the drawings, each portion of the cage consists of a base ring 18 which extends from the outer point 19 near the edge of the bearing, toward the plane of the ball centers. This base ring 18, in operation, runs very closely to but does not quite touch the outer circumference of the inner raceway 12, and carries integral with it the half ball pockets 17 and is notched away after joining the ball pockets 17 to conform to their shape and admit the balls.

The radial edges of adjacent ball pocket segments of each major portion 14 and 15 of the ball cage are connected by partitions 21 which, as shown, are formed integral with the walls of the ball pocket segments which they connect, respectively.

Figure 3:
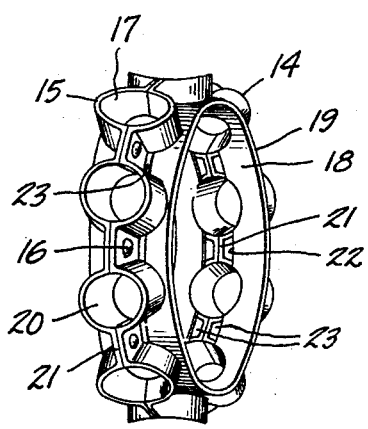
Fig. 3 is a perspective view of a complete cage assembly separate from the bearing.
Figure 4:
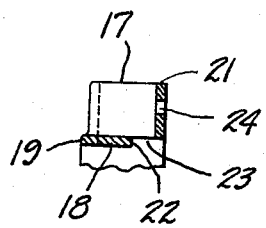
Fig. 4 is a section taken on line 4—4 of Fig. 2.

In accordance with my invention, the base ring 18 terminates short of the plane of the ball centers, and the inner edges of the partitions 21 terminate substantially flush with the outer surface of said base ring, as clearly shown in Fig. 3, thus, when the major cage portions 14 and 15 are connected, providing a free unobstructed passageway 22 which extends circumferentially entirely around the finished cage, and also providing openings 23, between and outside of adjacent ball pockets—formed by terminating the base ring 18 short of the partitions 21, as described. Both the circumferential passageway 22 and the openings 23 are proportioned to provide a passageway and openings of such large size that when the finished bearing is immersed in a liquid bath and the inner bearing member and ball cage are rotated at high speed, the centrifugal force created will produce a circulation of oil in the passageway 22 circumferentially of the bearing and currents of oil from the passageway 22 outwardly through the openings 23, which will operate to expel all metal chips and other dirt particles from the bearing, thus greatly enhancing the performance and life of the bearing.

It will be noted that the aperture 23, in each half portion of the cage, join between the pockets and together become large exits for foreign matter directly in line with that part of the ball surface that rotates at the highest speed and hence where the greatest centrifugal force is developed.

The particular embodiment of my invention disclosed in the accompanying drawings lends itself readily to the production of each half cage made completely in a single die casting operation of some hard bearing metal such as bronze and cast in a metal mold, such a method of manufacture insuring accurate duplication of pieces without need of machine work, the whole process producing the maximum of economy and accuracy.

What I claim is:

A two-part cage for ball bearings, each part comprising a base ring, pocket segments integral therewith, and partitions which connect the adjacent edges of adjacent pocket segments, the inner edge of the base ring terminating short of the partitions which connect the pocket segments and the lower edges of said partitions terminating substantially flush with the outer surface of said base ring, forming a circumferential passageway extending entirely around the inner surface of the cage and also forming openings between adjacent pocket segments outside of said segments, both said circumferential passageway and openings being proportioned to form a passageway and openings of such large size that when a finished bearing is immersed in a washing liquid and the inner bearing member and ball cage are rotated rapidly relative to the outer bearing member, the centrifugal force created will produce a circulation of oil in said passageway circumferentially of the bearing and currents of oil outwardly through the openings between the pocket segments, which will operate to expel dirt particles from the bearing.

FRANK R. SCHUBERT.